United States Patent
Xu et al.

(10) Patent No.: US 11,017,134 B1
(45) Date of Patent: May 25, 2021

(54) QUANTITATIVE SCORING AND OPTIMIZATION METHOD OF DRILLING AND COMPLETION LOSS-CONTROL MATERIAL

(71) Applicant: Southwest Petroleum University, Sichuan (CN)

(72) Inventors: Chengyuan Xu, Sichuan (CN); Yili Kang, Sichuan (CN); Lijun You, Sichuan (CN); Chao Jiang, Sichuan (CN); Xiaopeng Yan, Sichuan (CN); Jingyi Zhang, Sichuan (CN); Chong Lin, Sichuan (CN); Hexiang Zhou, Sichuan (CN); Bin Yang, Sichuan (CN); Chuan Liu, Sichuan (CN)

(73) Assignee: Southwest Petroleum University, Sichuan (CN)

( * ) Notice: Subject to any disclaimer, the term of this patent is extended or adjusted under 35 U.S.C. 154(b) by 0 days.

(21) Appl. No.: 17/257,004

(22) PCT Filed: Jan. 8, 2020

(86) PCT No.: PCT/CN2020/070778
§ 371 (c)(1),
(2) Date: Dec. 30, 2020

(87) PCT Pub. No.: WO2020/220745
PCT Pub. Date: Nov. 5, 2020

(30) Foreign Application Priority Data

Apr. 29, 2019 (CN) .......................... 201910356871.X

(51) Int. Cl.
*G06F 30/25* (2020.01)
*G06F 111/10* (2020.01)

(52) U.S. Cl.
CPC .......... *G06F 30/25* (2020.01); *G06F 2111/10* (2020.01)

(58) Field of Classification Search
CPC .......................... G06F 30/25; G06F 2111/10
(Continued)

(56) References Cited

U.S. PATENT DOCUMENTS

| 7,346,588 B2 * | 3/2008 | Shimizu | ................ G06Q 10/06 705/400 |
| 2010/0185401 A1 * | 7/2010 | Hernandez | ................ F17D 5/00 702/25 |

(Continued)

FOREIGN PATENT DOCUMENTS

CN 102033988 A 4/2011

*Primary Examiner* — Phallaka Kik

(57) ABSTRACT

A quantitative scoring and optimization method of a drilling and completion loss-control material includes: extracting key performance parameters of drilling and completion loss-control materials in loss-circulation zone, sequencing the key performance parameters according to their importance; performing weight calculation on the key performance parameters of the loss-control material by an analytic hierarchy process; determining scores of the key performance parameters of conventional loss-control materials according to an experimental evaluation table of the performance parameters of the loss-control materials; calculating comprehensive scores of all loss-control materials and performing optimal selection on the loss-control materials according to the comprehensive scores. The present disclosure provides a quantitative evaluation table of performance parameters of the loss-control materials, and an optimal selection method of the loss-control materials for different loss-control formations according to the analytic hierarchy process.

8 Claims, 2 Drawing Sheets

(58) Field of Classification Search
USPC .................. 702/2, 9, 113, 128; 703/7, 9
See application file for complete search history.

(56) References Cited

U.S. PATENT DOCUMENTS

| | | | |
|---|---|---|---|
| 2012/0160658 A1* | 6/2012 | Bartek | C10L 1/02 201/1 |
| 2014/0114627 A1* | 4/2014 | Jones | G06F 30/20 703/2 |
| 2015/0234092 A1* | 8/2015 | Wu | E21B 47/10 703/2 |

* cited by examiner

QUANTITATIVE SCORING AND OPTIMIZATION METHOD OF DRILLING AND COMPLETION LOSS-CONTROL MATERIAL

TECHNICAL FIELD

The present disclosure generally relates to a technical field of loss control, and relates to a quantitative scoring and optimization method of a drilling and completion loss-control material based on an analytic hierarchy process.

DESCRIPTION OF RELATED ART

A large amount of working fluids is lost into lost-circulation zone so that a drilling and completion cost and a construction cycle are increased during developing an oil-and-gas field, and even lead to a stuck drilling and other accidents, thereby a process of exploration and development of oil-and-gas resources is seriously affected. Such situation is always a major technical problem to plague oil exploration and development at home and abroad without being completely solved up to now.

As a supplement, a loss control is a main method to solve the loss of working fluid in the loss-circulation zone, however, with continuous development of loss control technology, loss-control materials have become various. So, different loss-control materials need to be selected according to an actual loss of different strata due to complex well conditions. However, researchers usually choose the loss-control materials based on their experience or after a large number of experiments, but it is uncertain whether the selected loss-control material is an optimal loss-control material at last. Furthermore, none unified selection standard or method is to select the loss-control materials.

SUMMARY

The technical problems to be solved: in view of the shortcomings of the related art, the present disclosure relates to a quantitative scoring and optimization method of a drilling and completion loss-control material based on an analytic hierarchy process (AHP) for scoring drilling and completion loss-control materials, so as to provide a basis for researchers to optimally select loss-control materials from plugging formula.

The technical solution adopted for solving technical problems of the present disclosure is:

a quantitative scoring and optimization method of a drilling and completion loss-control material based on an analytic hierarchy process according to an embodiment of the present disclosure includes the following steps:

step 1: obtaining performance parameters of drilling and completion loss-control materials and then extracting key performance parameters from the performance parameters; wherein the performance parameters including mechanical parameters, chemical parameters and geometric parameters, the mechanical parameters including but not limited to friction coefficient, compressive resistance, abrasion resistance and fiber tensile strength; the chemical parameters including but not limited to acid solubility and temperature resistance; the geometric parameters including but not limited to shape, aspect ratio of fiber, sphericity and particle size distribution; and an extraction basis of extracting the key performance parameters from the performance parameters including but not limited to a prediction model of a loss control effect extracted from the performance parameters according to a specific geological condition of loss-circulation zone;

step 2: sequencing the key performance parameters obtained in the step 1 to determine their relative importance between each two key performance parameters; wherein the sequence of the key performance parameters is qualitatively determined by researchers based on a specific situation and experience, and a scale of the importance is carried out by the researchers according to the specific situation and the experience;

step 3: performing weight calculation on each key performance parameter of the loss-control material by an analytic hierarchy process (AHP);

step 4: obtaining key performance experiment parameters of conventional loss-control materials and then performing evaluation on the key performance experiment parameters of the conventional loss-control materials; and according to an established parameter evaluation standard, dividing the key performance parameters of the conventional loss-control materials into five grades: a high grade, a medium-high grade, a medium grade, a medium-low grade and a low grade respectively corresponding to a different score;

step 5: calculating comprehensive scores of each conventional loss-control material according to results of the step 3 and the step 4;

step 6: obtaining the loss-control material with the highest score as an optimal loss-control material according to the comprehensive score of the each conventional loss-control material calculated in the step 5, or scores ranked in the top 5% of the loss-control materials from the top to the bottom under considering an economic cost of the loss-control materials.

Furthermore, the prediction model of the loss control effect in the step 1 is:

$$P_z = \frac{a\left(1 - \phi - \frac{A_f}{A}\right)k_p \varepsilon_p \tan\delta_1}{\Delta H \pi d_p^2} +$$

$$2P_c\left(\frac{A_f}{A}\right)\left(\frac{1 - \sin\delta_1\sin(\delta_1 - 2\theta_i)}{3\pi\cos^2\delta_1}\right)\left(\frac{l_f}{d_f}\right)\tan\delta_2\sin\alpha(\cos\theta + \sin\theta\tan\delta_1)$$

$$\text{wherein: } \theta = \arcsin\frac{\sin\theta_i}{1 + 2\left(\frac{P_c'}{E_f}\right)\left(\frac{1 - \sin\delta_1\sin(\delta_1 - 2\theta_i)}{\cos^2\delta_1}\right)\left(\frac{l_f}{d_f}\right)\tan\delta_2\sin\theta_i}$$

wherein: $P_z$ is sealing capacity which represents the loss control effect (unit: MPa); $\Delta H$ is a height of a shear destruction portion of crevice loss-control formation (unit: mm); W is a width of loss-control crevice (unit: mm); H is a height of a crevice (unit: mm); h is a height of loss-control formation (unit: mm); $\phi$ is a void-ratio of the loss-control formation (unit: %); $A_f$ is an area of fiber in a cross section (unit: mm$^2$); A is a total area of a cross section (unit: mm$^2$); $k_p$ is a stiffness of particle materials (unit: N/mm); $\varepsilon_p$ is a particle contact deformation (unit: mm); $E_f$ is a fiber elastic modulus (unit: Mpa); $P_c$ is a fracture closure pressure (unit: Mpa); Pc/ is a fracture horizontal pressure (unit: Mpa); δ1 is a particle surface friction angle (unit: °); δ2 is a fiber surface friction angle (unit: °); δ3 is an angle between the loss-control formation and a fracture surface (unit: °); $d_p$ is an average particle diameter (unit: mm); $l_f$ is a length of fiber (unit: mm); α is an initial inclination angle of fiber (unit: °);

$d_f$ is a fiber diameter (unit: mm); $\theta_i$ is an original inclination angle of fiber (unit: °); $\theta$ is an inclination angle after the fiber is sheared (unit: °); $\sigma_{fc}$ is fiber tensile strength (unit: MPa); a is a height of loss-control formation (unit: mm).

Furthermore, a specific operation process of the step 3 includes as follows:

step 3.1: performing pairwise comparison on relative importance of elements in a same formation by an unified standard, and then constructing a judgment matrix, the judgment matrix of the key performance parameters in the loss-circulation zone shown below:

$$B = \begin{bmatrix} b_{11} & b_{12} & \cdots & b_{1j} \\ b_{21} & b_{22} & \cdots & b_{2j} \\ \vdots & \vdots & \ddots & \vdots \\ b_{i1} & b_{i2} & \cdots & b_{ij} \end{bmatrix}$$

wherein the formula (1) shown below is represented a proportion of the importance of the parameter i relative to the parameter j:

$$b_{ij} = \begin{cases} 1, & i = j \\ \dfrac{1}{b_{ji}}, & i \neq j \end{cases} \quad (1)$$

and a proportion scale of the importance in the key performance parameters is shown in the following table:

| scale | Importance of parameters |
|---|---|
| 1 | Parameter i is important same as parameter j. |
| 3 | Parameter i is slightly more important than parameter j. |
| 5 | Parameter i is significantly more important than parameter j. |
| 7 | Parameter i is more important than parameter j. |
| 9 | Parameter i is extremely important than parameter j. |
| 2, 4, 6, 8 | Taking a median when a relative importance grade is between adjacent importance grades. | step 3.2: performing a normalization on each column element of the judgment matrix, and a general term of the element is:

$$\overline{b_{ij}} = \frac{b_{ij}}{\sum_{i=1}^{n} b_{ij}}, (i, j = 1, 2, \ldots, n)$$

wherein: $b_{ij}$ represents an element of the ith row and the jth column of the judgment matrix, and n represents the order of the judgment matrix;

step 3.3: adding the normalized judgment matrixes of each column according to rows, namely:

$$\overline{W_i} = \sum_{j=1}^{n} \overline{b_{ij}}, (j = 1, 2, \ldots, n)$$

step 3.4: a vector quantity $\overline{W} = [\overline{W_1}, \overline{W_2}, \ldots, \overline{W_j}]$ (j=1, 2, ..., n), performing a normalization on the vector quantity $\overline{W}$ so that an obtained result is an eigenvector, that is:

$$W = \frac{\overline{W}}{\sum_{j=1}^{n} \overline{W_j}}, (j = 1, 2, \ldots, n)$$

wherein an element in the eigenvector W is a weight of a corresponding parameter;

step 3.5: calculating the maximum feature root by the judgment matrix and the eigenvector, namely:

$$\lambda_{max} = \sum_{i=1}^{n} \frac{(BW)_i}{nW_j}$$

wherein: $(BW)_i$ represents the ith element of the vector;

step 3.6: calculating a consistency of the judgment matrix, and then verifying by the following formulas:

$$CR = \frac{CI}{RI}$$

$$CI = \frac{\lambda_{max} - n}{n - 1}$$

wherein: CI represents a consistency parameter and RI represents a random consistency parameter, with values being shown in the following table:

| n | 1 | 2 | 3 | 4 | 5 | 6 | 7 | 8 | 9 |
|---|---|---|---|---|---|---|---|---|---|
| RI | 0 | 0 | 0.58 | 0.94 | 1.12 | 1.24 | 1.32 | 1.41 | 1.45 | if CR<0.1, a degree of inconsistency of the judgment matrix is determined within a permissible range, and the eigenvector of the judgment matrix is a weight vector; otherwise, returning back the step 3.1 to adjust a relative importance of two elements until satisfy the consistency condition.

Furthermore, a relationship between the key performance parameter grades and score values in the step 4 is shown in the table below:

| score value | 10 | 8 | 6 | 4 | 2 |
|---|---|---|---|---|---|
| key performance parameter grade | high | medium-high | medium | medium-low | low | at the same time, a performance parameter evaluation table is obtained by evaluating a large number of performance parameters of the loss-control materials, which is applicable to all loss-circulation zones; and some performance parameter evaluation is shown in the following table:

| Performance parameter | Parameter evaluation | | | | |
|---|---|---|---|---|---|
| Degree of sphericity | ≤0.3 low | 0.3-0.5 medium-low | 0.5-0.7 medium | 0.7-0.9 medium-high | >0.9 high |
| Friction coefficient | ≤0.5 low | 0.5-0.8 medium-low | 0.8-1.1 medium | 1.1-1.4 medium-high | >1.4 high |
| Temperature resistance | >0.3 low | 0.2-0.3 medium-low | 0.1-0.2 medium | 0.05-0.1 medium-high | ≤0.05 high |
| Abrasion resistance | >0.3 low | 0.2-0.3 medium-low | 0.1-0.2 medium | 0.05-0.1 medium-high | ≤0.05 high |
| Aspect ratio of fiber | ≤100 low | 100-200 medium-low | 200-400 medium | 400-600 medium-high | >600 high |
| Soluble rate | ≤0.2 low | 0.2-0.4 medium-low | 0.4-0.6 medium | 0.6-0.8 medium-high | >0.8 high |
| Temperature resistance of particle size | >0.3 low | 0.2-0.3 medium-low | 0.1-0.2 medium | 0.05-0.1 medium-high | ≤0.05 high |
| Strength temperature resistance | >0.3 low | 0.2-0.3 medium-low | 0.1-0.2 medium | 0.05-0.1 medium-high | ≤0.05 high |

Furthermore, a formula for calculating comprehensive scores of each conventional loss-control material in the step 5 is:

$$S = \sum_{i=1}^{n} \varphi_i(x)\phi_i(x)$$

Wherein: S represents a final score of the loss-control materials or loss-control formula, $\varphi_i^{(x)}$ and $\phi_i^{(x)}$ respectively represents the weight of each key performance parameter and a score value of a corresponding parameter.

Compared with the related art, the present disclosure provides the advantages as below.

(1) the quantitative scoring and optimization method of a drilling and completion loss-control material of the present disclosure based on an analytic hierarchy process can systematically consider geological condition and loss situation of the loss information, so as to provide a scientific and reasonable basis for researchers to choose the loss-control material, and further minimize experiment cost and time and avoid researchers to blindly choose loss-control materials.

(2) An accuracy and superiority of the evaluation system can be achieved based on a performance parameter evaluation table obtained by evaluating a large number of performance parameters of the loss-control materials, based on key performance parameters selected according to a specific loss-circulation zone, and based on considering performance requirements of the loss-circulation zone of the loss-control materials.

(3) A scoring system can be constructed by the analytic hierarchy process (AHP) so as to perform weight calculation on each performance parameter, and ensure accuracy results by consistency tests.

DETAILED DESCRIPTION

Figure 1:
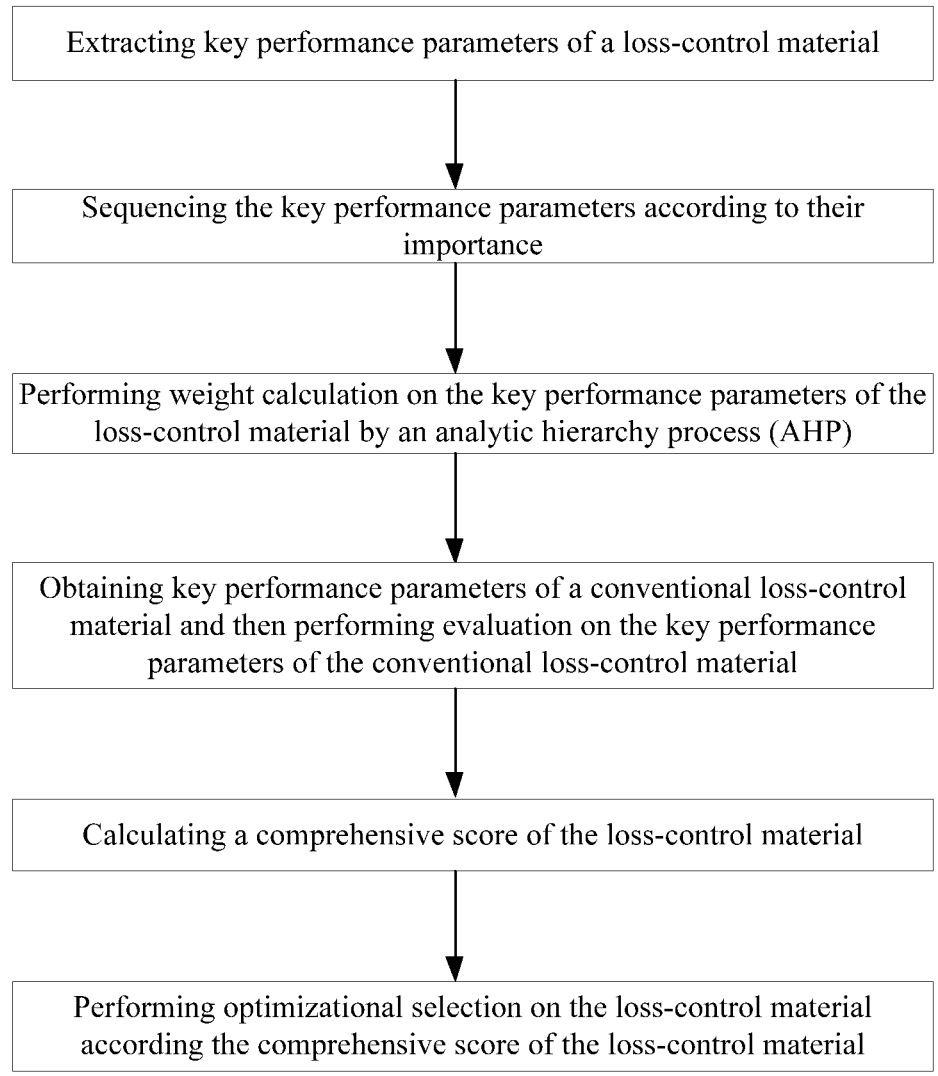
FIG. 1 is a flowchart of a hierarchical-order structure model of a quantitative scoring and optimization method of a drilling and completion loss-control material in accordance with an embodiment of the present disclosure.
Figure 2:
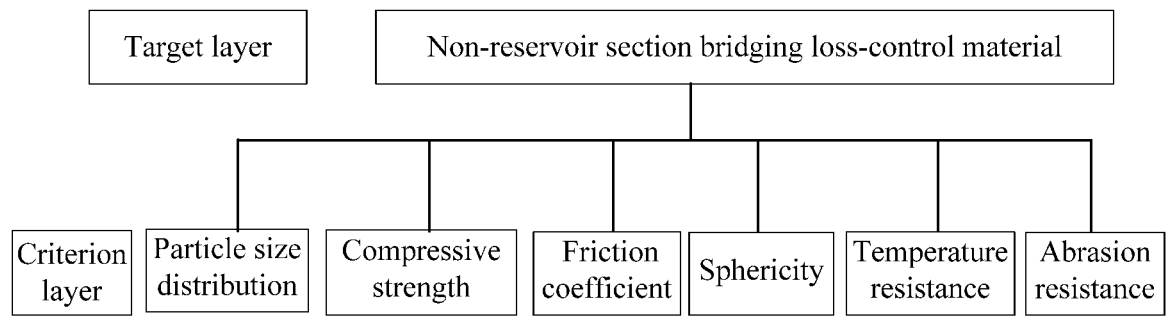
FIG. 2 is a flowchart of an optimal hierarchy of a loss-control material in accordance with an embodiment of the present disclosure.
Figure 3:
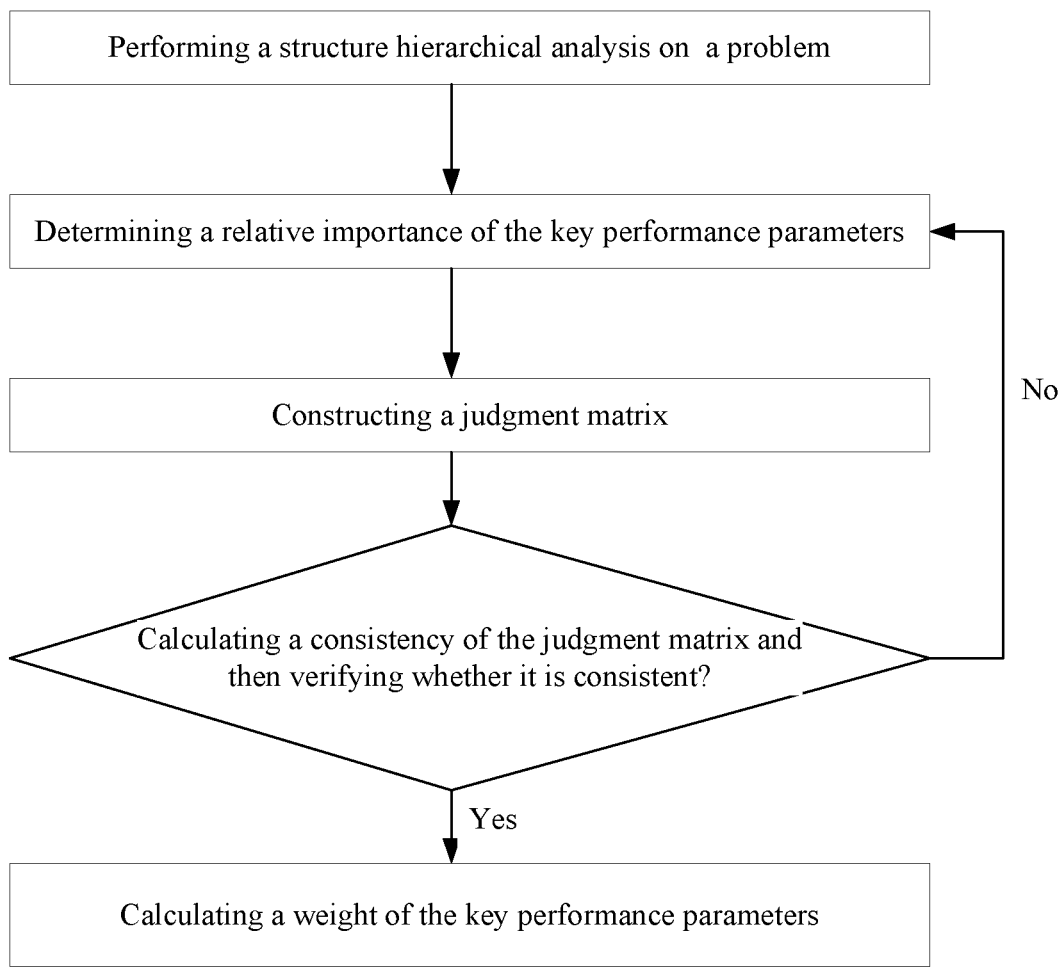
FIG. 3 is a flowchart of an analytic hierarchy process in accordance with an embodiment of the present disclosure.

In order to more clearly understand and implement the present disclosure for one of ordinary skill in the related art, the principles and characteristics of the present disclosure are described on the basis of these drawings and embodiments; the examples cited are provided only to interpret the present disclosure, but not to limit the scope of the present disclosure.

A quantitative scoring and optimization method of a drilling and completion loss-control material based on an analytic hierarchy process according to an embodiment of the present disclosure includes the following steps:

step 1: extracting performance parameters of drilling and completion loss-control materials;

according to a loss control mechanism of drilling and completion and a prediction model of a loss control effect, determining performance requirements of the loss information for loss-control materials, and then extracting key performance parameters of the drilling and completion loss-control materials for the loss-circulation zone from the performance parameters, wherein the prediction model of the loss control effect can refer to but not limited to the following formula, and relevant performance parameters include, but are not limited to, geometric parameters, mechanical parameters and chemical parameters listed in table 1 below.

$$P_z = \frac{a\left(1 - \phi - \frac{A_f}{A}\right)k_p \varepsilon_p \tan\delta_1}{\Delta H \pi d_p^2} +$$

$$2P_c\left(\frac{A_f}{A}\right)\left(\frac{1 - \sin\delta_1 \sin(\delta_1 - 2\theta_i)}{3\pi \cos^2\delta_1}\right)\left(\frac{l_f}{d_f}\right)\tan\delta_2 \sin a(\cos\theta + \sin\theta \tan\delta_1)$$

$$\text{wherein: } \theta = \arcsin\frac{\sin\theta_i}{1 + 2\left(\frac{P'_c}{E_f}\right)\left(\frac{1 - \sin\delta_1 \sin(\delta_1 - 2\theta_i)}{\cos^2\delta_1}\right)\left(\frac{l_f}{d_f}\right)\tan\delta_2 \sin\theta_i}$$

wherein: $P_z$ is sealing capacity which represents the loss control effect (unit: MPa); $\Delta H$ is a height of a shear destruction portion of crevice loss-control formation (unit: mm); W is a width of loss-control crevice (unit: mm); H is a height of a crevice (unit: mm); h is a height of loss-control formation (unit: mm); $\phi$ is a void-ratio of the loss-control formation (unit: %); $A_f$ is an area of fiber in a cross section (unit: mm$^2$); A is a total area of a cross section (unit: mm$^2$); $k_p$ is a stiffness of particle materials (unit: N/mm); $\varepsilon_p$ is a particle contact deformation (unit: mm); $E_f$ is a fiber elastic modulus (unit: Mpa); $P_c$ is a fracture closure pressure (unit: Mpa); Pc/ is a fracture horizontal pressure (unit: Mpa); $\delta 1$ is a particle surface friction angle (unit: °); $\delta 2$ is a fiber surface friction angle (unit: °); $\delta 3$ is an angle between the loss-control formation and a fracture surface (unit: °); $d_p$ is an average particle diameter (unit: mm); $l_f$ is a length of fiber (unit: mm); α is an initial inclination angle of fiber (unit: °); $d_f$ is a fiber diameter (unit: mm); $\theta_i$ is an original inclination angle of fiber (unit: °); θ is an inclination angle after the fiber is sheared (unit: °); $\sigma_{fc}$ is fiber tensile strength (unit: MPa); a is a height of loss-control formation (unit: mm).

TABLE 1

Performance parameters of drilling and
completion loss-control materials;

| Loss-control material | Geometric parameter | Form factor |
| --- | --- | --- |
| | | Aspect ratio of fiber |
| | | Degree of sphericity |
| | | Particle size distribution |
| | Mechanical parameter | Friction coefficient |
| | | Compressive resistance |
| | | Abrasion resistance |
| | | Expansion rate |
| | | Fiber tensile strength |
| | Chemical parameter | Acid-solubility rate |
| | | Temperature resistance | step 2: according to a temperature, a pressure, a ground stress and other geological characteristic parameters of the loss-circulation zone, a type of the loss and requirements of a loss-control construction, sequencing the key performance parameters obtained in the step 1 according to their relative importance; wherein their importance is scaled by researchers according to a specific situation and experiences;

step 3: performing weight calculation on the key performance parameters of the loss-control materials by an analytic hierarchy process (AHP);

the importance of the loss-control materials is qualitatively evaluated, and then the qualitative sorting is converted into a quantitative sorting by the analytic hierarchy process (AHP), which is shown as the weight of each key performance parameter;

step 3.1: performing pairwise comparison on relative importance of elements in a same formation by an unified standard, and then constructing the judgment matrix, the judgment matrix of the key performance parameters in the loss-circulation zone shown below:

$$B = \begin{bmatrix} b_{11} & b_{12} & \ldots & b_{1j} \\ b_{21} & b_{22} & \ldots & b_{2j} \\ \vdots & \vdots & \ddots & \vdots \\ b_{i1} & b_{i2} & \ldots & b_{ij} \end{bmatrix}$$

wherein the formula (1) shown below is represented a proportion of the importance of the parameter i relative to the parameter j:

$$b_{ij} = \begin{cases} 1, & i = j \\ \dfrac{1}{b_{ji}}, & i \neq j \end{cases} \quad (1)$$

and a proportion scale of the importance in the key performance parameters is shown in the following table 2:

TABLE 2

Proportional scale of importance in the key performance parameters

| scale | Importance of parameters |
| --- | --- |
| 1 | Parameter i is important same as parameter j. |
| 3 | Parameter i is slightly more important than parameter j. |
| 5 | Parameter i is significantly more important than parameter j. |

TABLE 2-continued

Proportional scale of importance in the key performance parameters

| scale | Importance of parameters |
| --- | --- |
| 7 | Parameter i is more important than parameter j. |
| 9 | Parameter i is extremely important than parameter j. |
| 2, 4, 6, 8 | Taking a median when a relative importance grade is between adjacent importance grades. | step 3.2: performing a normalization on each column element of the judgment matrix, and a general term of the element is:

$$\overline{b_{ij}} = \frac{b_{ij}}{\sum_{i=1}^{n} b_{ij}}, (i, j = 1, 2, \ldots, n)$$

wherein: $b_{ij}$ represents an element of the ith row and the jth column of the judgment matrix, and n represents the order of the judgment matrix;

step 3.3: adding the normalized judgment matrixes of each column according to rows, namely:

$$\overline{W_i} = \sum_{j=1}^{n} \overline{b_{ij}}, (j = 1, 2, \ldots, n)$$

step 3.4: the vector quantity $\overline{W} = [\overline{W_1}, \overline{W_2}, \ldots, \overline{W_j}]$ (j=1, 2, ..., n), performing a normalization on the vector quantity $\overline{W}$ so that an obtained result is an eigenvector, that is:

$$W = \frac{\overline{W}}{\sum_{j=1}^{n} \overline{W_j}}, (j = 1, 2, \ldots, n)$$

wherein an element in the eigenvector W is a weight of a corresponding parameter;

step 3.5: calculating the maximum feature root by the judgment matrix and the eigenvector, namely:

$$\lambda_{max} = \sum_{i=1}^{n} \frac{(BW)_i}{nW_j}$$

wherein: $(BW)_i$ represents the ith element of the vector;

step 3.6: calculating a consistency of the judgment matrix, and then verifying by the following formulas:

$$CR = \frac{CI}{RI}$$

$$CI = \frac{\lambda_{max} - n}{n - 1}$$

wherein: CI represents a consistency parameter and RI represents a random consistency parameter, with values being shown in the following table 3:

TABLE 3 average random consistency parameter

| n | 1 | 2 | 3 | 4 | 5 | 6 | 7 | 8 | 9 |
|---|---|---|---|---|---|---|---|---|---|
| RI | 0 | 0 | 0.58 | 0.94 | 1.12 | 1.24 | 1.32 | 1.41 | 1.45 | if CR<0.1, a degree of inconsistency of the judgment matrix is determined within a permissible range, and the eigenvector of the judgment matrix is a weight vector; otherwise, returning back the step 3.1 to adjust a relative importance of two elements to satisfy the consistency condition.

Step 4: experimentally evaluating key performance parameters of conventional loss-control materials;

obtaining the key performance parameters of the conventional loss-control materials, and then classifying the performance parameters according to the performance parameter evaluation table shown in Table 4, and finally obtaining scores of the key performance parameters of the loss-control materials according to Table 5 and Table 6 shown below.

Table 4 partial performance parameter evaluation table of the loss-control materials

TABLE 4 partial performance parameter evaluation table of the loss-control materials

| Performance parameter | Parameter evaluation | | | | |
|---|---|---|---|---|---|
| Degree of sphericity | ≤0.3 low | 0.3-0.5 medium-low | 0.5-0.7 medium | 0.7-0.9 medium-high | >0.9 high |
| Friction coefficient | ≤0.5 low | 0.5-0.8 medium-low | 0.8-1.1 medium | 1.1-1.4 medium-high | >1.4 high |
| Temperature resistance | >0.3 low | 0.2-0.3 medium-low | 0.1-0.2 medium | 0.05-0.1 medium-high | ≤0.05 high |
| Abrasion resistance | >0.3 low | 0.2-0.3 medium-low | 0.1-0.2 medium | 0.05-0.1 medium-high | ≤0.05 high |
| Aspect ratio of fiber | ≤100 low | 100-200 medium-low | 200-400 medium | 400-600 medium-high | >600 high |
| Soluble rate | ≤0.2 low | 0.2-0.4 medium-low | 0.4-0.6 medium | 0.6-0.8 medium-high | >0.8 high |
| Temperature resistance of particle size | >0.3 low | 0.2-0.3 medium-low | 0.1-0.2 medium | 0.05-0.1 medium-high | ≤0.05 high |
| Strength temperature resistance | >0.3 low | 0.2-0.3 medium-low | 0.1-0.2 medium | 0.05-0.1 medium-high | ≤0.05 high |

Wherein: compressive resistance, abrasion resistance and strength high temperature resistance of the loss-control materials is evaluated by particle size with a D90 degradation rate under 25 MPa. The particle size with the D90 degradation rate after high temperature aging is compared with the particle size with the D90 degradation rate before high temperature aging to evaluate the high temperature resistance of the particle size. A final high temperature resistance is a smaller value selected from the particle size with the high temperature resistance and the particle size with the strength high temperature resistance.

Table 5 scores corresponding to different grades of partial performance parameters of the loss-control materials

TABLE 5 scores corresponding to different grades of partial performance parameters of the loss-control materials

| Score | 10 | 8 | 6 | 4 | 2 |
|---|---|---|---|---|---|
| Friction coefficient | high | medium-high | medium | medium-low | low |
| Compressive strength of particle | high | medium-high | medium | medium-low | low |
| Fiber tensile strength | high | medium-high | medium | medium-low | low |
| Degree of sphericity | low | medium-low | medium | medium-high | high |
| Temperature resistance | high | medium-high | medium | medium-low | low |
| Abrasion resistance | high | medium-high | medium | medium-low | low |
| Aspect ratio of fiber | high | medium-high | medium | medium-low | low |

TABLE 6 scores corresponding to different grades of the loss-control materials D90

| | Score | 5 | 7 | 10 | 8 | 6 |
|---|---|---|---|---|---|---|
| D90 | First grade | <0.7 Wf | 0.7-0.9 Wf | 0.9-1.1 Wf | 1.1-1.3 Wf | >1.3 Wf |
| | Second grade | <1/7 Wf | 1/7-1/3 Wf | 1/3-1/2 Wf | 1/2-2/3 Wf | >2/3 Wf |
| | Third grade | <1/49 Wf | 1/49-1/9 Wf | 1/9-1/4 Wf | 1/4-4/9 Wf | >4/9 Wf |

Step 5: calculating comprehensive scores of each conventional loss-control material by a scoring method;

a comprehensive scoring function of the drilling and completion loss-control material is as follows:

$$S = \sum_{i=1}^{n} \varphi_i(x)\phi_i(x)$$

Wherein: S represents a final score of the loss-control materials or plugging formula, $\phi_i^{(x)}$ and $\phi_i^{(x)}$ respectively represents the weight of each key performance parameter and a score value of a corresponding parameter.

Step 6: obtaining the loss-control material with the highest score as an optimal loss-control material suitable for the loss-circulation zone according to comprehensive scores of the loss-control materials.

A first embodiment of the present disclosure:

The first embodiment of the present disclosure is provided quantitative evaluation of bridging materials in a reservoir section of a block in front of the Kuqa Mountain as an example. A loss-circulation zone is a reservoir section with a high temperature, a high pressure and a high-ground stress. According to the loss control mechanism of drilling and completion, the prediction model of the loss control effect and characteristics of the loss-circulation zone, the key performance parameters of the loss-control materials can be selected as follows: particle size distribution D90, friction coefficient, degree of sphericity, high temperature resistance, compressive resistance and abrasion resistance.

The key performance parameters are sequenced according to their importance to a loss effect of the reservoir section in the block so that the degree of their importance is in descending order: the particle size distribution D90>the friction coefficient>the degree of sphericity>the high temperature resistance>the pressure resistance>the abrasion resistance.

A judgment matrix for the above key performance parameters of the loss-control materials is as follows:

$$B = \begin{bmatrix} 1 & 2 & 5 & 6 & 7 & 8 \\ 1/2 & 1 & 4 & 5 & 6 & 7 \\ 1/5 & 1/4 & 1 & 2 & 5 & 6 \\ 1/6 & 1/5 & 1/2 & 1 & 4 & 5 \\ 1/7 & 1/6 & 1/5 & 1/4 & 1 & 2 \\ 1/8 & 1/7 & 1/6 & 1/5 & 1/2 & 1 \end{bmatrix}$$

The weight of each key performance parameter is calculated by the analytic hierarchy process (AHP) as shown in Table 7:

TABLE 7

| Performance parameter | Particle size distribution D90 | Friction coefficient | Degree of sphericity | Temperature resistance | Pressure resistance | Abrasion resistance |
|---|---|---|---|---|---|---|
| Weight | 0.418 | 0.295 | 0.130 | 0.090 | 0.039 | 0.028 | relative weight of key performance parameters

Finally, final scores of the loss-control materials are calculated so that the key performance parameters of the loss-control materials with higher final scores and their final scores are shown in Table 8 and Table 9, and then the loss-control material with the highest score is selected to test a plugging effect.

TABLE 8

Key performance parameter grades of bridging materials in non-reservoir sections of the block

| Serial number | Number | Particle size distribution D90(μm) | Pressure resistance | Friction coefficient | Temperature resistance | Degree of sphericity | Abrasion resistance |
|---|---|---|---|---|---|---|---|
| 1 | LCM-K3 | 6836.2 | medium-high | high | high | medium-low | high |
| 2 | LCM-K4 | 4207.9 | medium | high | medium-high | medium-low | medium-low |
| 3 | LCM-K5 | 2715.3 | medium | medium-high | high | medium-low | medium |
| 4 | LCM-D2 | 4308.4 | high | medium | high | medium-high | high |
| 5 | LCM-D3 | 4446.1 | high | medium-high | high | medium-high | high |
| 6 | LCM-D4 | 3384.6 | high | medium-high | high | medium-high | medium-high |

TABLE 9

Scores of key performance parameters of bridging materials in non-reservoir sections in the block and final scores of materials

| Serial number | Number | Particle size distribution D90(μm) | Pressure resistance | Friction coefficient | Temperature resistance | Degree of sphericity | Abrasion resistance | Comprehensive score |
|---|---|---|---|---|---|---|---|---|
| 1 | LCM-K3 | 7 | 8 | 10 | 10 | 8 | 10 | 8.41 |
| 2 | LCM-K4 | 8 | 6 | 10 | 8 | 8 | 4 | 8.40 |
| 3 | LCM-K5 | 6 | 6 | 8 | 10 | 8 | 6 | 8.10 |

TABLE 9-continued

Scores of key performance parameters of bridging materials in non-reservoir sections in the block and final scores of materials

| Serial number | Number | Particle size distribution D90(μm) | Pressure resistance | Friction coefficient | Temperature resistance | Degree of sphericity | Abrasion resistance | Comprehensive score |
|---|---|---|---|---|---|---|---|---|
| 4 | LCM-D2 | 8 | 10 | 6 | 10 | 4 | 10 | 6.79 |
| 5 | LCM-D3 | 8 | 10 | 8 | 10 | 4 | 10 | 7.79 |
| 6 | LCM-D4 | 5 | 10 | 8 | 10 | 4 | 8 | 6.48 |

According to the comprehensive scores of the loss-control materials, it can be seen that the loss-control material 1CM-K3 has the highest comprehensive score, that is, the loss-control material 1CM-K3 is most suitable as the bridging material of the reservoir section in the block so as to be used for leakage plugging test. The plugging experiment results are shown that the loss-control material 1CM-K3 is the best material, which can prove predictability and superiority of the method of the present disclosure.

The present disclosure is provided the analytic hierarchy process (AHP) for a quantitative scoring and optimization method of a drilling and completion loss-control material, which can scientifically and effectively score and optimize an application degree of the loss-control materials to a target formation, and save time and cost for researchers.

The foregoing description is not in any form a limitation to the present disclosure. Although the features and elements of the present disclosure are described as embodiments in particular combinations, but not intended to limit the protection scope of the present disclosure, each feature or element can be used alone or in other various combinations within the principles of the present disclosure to the full extent indicated by the broad general meaning of the terms in which the appended claims are expressed. Any variation or replacement made by one of ordinary skill in the related art without departing from the spirit of the present disclosure shall fall within the protection scope of the present disclosure.

What is claimed is:

1. A quantitative scoring and optimization method of a drilling and completion loss-control material comprising:
   step 1: obtaining performance parameters of drilling and completion loss-control materials and then extracting key performance parameters from the performance parameters;
   step 2: sequencing the key performance parameters obtained in the step 1 according to their relative importance;
   step 3: performing weight calculation on the key performance parameters of the loss-control materials by an analytic hierarchy process (AHP);
   step 4: obtaining key performance parameters of conventional loss-control materials and then performing evaluation on the key performance parameters of the conventional loss-control materials;
   step 5: calculating comprehensive scores of each conventional loss-control material according to results of the step 3 and the step 4;
   step 6: obtaining an optimal type of the loss-control materials according to the comprehensive score of the conventional loss-control material calculated in the step 5.

2. The quantitative scoring and optimization method of a drilling and completion loss-control material as claimed in claim 1, wherein the performance parameters in the step 1 comprises: mechanical parameters, chemical parameters and geometric parameters, the mechanical parameters comprising but not limited to friction coefficient, compressive resistance, abrasion resistance and fiber tensile strength; the chemical parameters comprising but not limited to acid solubility and temperature resistance; the geometric parameters comprising but not limited to a shape, an aspect ratio of fiber, a degree of sphericity and a particle size distribution.

3. The quantitative scoring and optimization method of a drilling and completion loss-control material as claimed in claim 1, wherein an extraction basis of extracting the key performance parameters from the performance parameters in the step 1 comprises but is not limited to a prediction model of a loss control effect extracted from the performance parameters according to a specific geological condition of loss-circulation zone.

4. The quantitative scoring and optimization method of a drilling and completion loss-control material as claimed in claim 1, wherein the step of sequencing the key performance parameters in the step 2 is qualitatively determined by researchers based on a specific situation and experiences, and a scale of the importance is carried out by researchers according to a specific situation and experiences.

5. The quantitative scoring and optimization method of a drilling and completion loss-control material as claimed in claim 1, wherein a specific operation process of the step 3 comprises as follows:
   step S1: performing pairwise comparison on relative importance of elements in a same formation by an unified standard, and then constructing the judgment matrix, the judgment matrix of the key performance parameters in the loss-circulation zone shown below:

$$B = \begin{bmatrix} b_{11} & b_{12} & \cdots & b_{1j} \\ b_{21} & b_{22} & \cdots & b_{2j} \\ \vdots & \vdots & \ddots & \vdots \\ b_{i1} & b_{i2} & \cdots & b_{ij} \end{bmatrix}$$

wherein the formula (1) shown below is represented a proportion of the importance of the parameter i relative to the parameter j:

$$b_{ij} = \begin{cases} 1, & i = j \\ \dfrac{1}{b_{ij}}, & i \neq j \end{cases} \quad (1)$$

and
a proportion scale of the importance in the key performance parameters is shown in the following table:

| scale | Importance of parameters |
|---|---|
| 1 | Parameter i is important same as parameter j. |
| 3 | Parameter i is slightly more important than parameter j. |
| 5 | Parameter i is significantly more important than parameter j. |
| 7 | Parameter i is more important than parameter j. |
| 9 | Parameter i is extremely important than parameter j. |
| 2, 4, 6, 8 | Taking a median when a relative importance grade is between adjacent importance grades. | step S2: performing a normalization on each column element of the judgment matrix, and a general term of the element is:

$$\overline{b_{ij}} = \frac{b_{ij}}{\sum_{i=1}^{n} b_{ij}}, (i, j = 1, 2, \ldots, n)$$

wherein: $b_{ij}$ represents an element of the ith row and the jth column of the judgment matrix, and n represents the order of the judgment matrix;

step S3: adding the normalized judgment matrixes of each column according to rows, namely:

$$\overline{W_i} = \sum_{j=1}^{n} \overline{b_{ij}}, (j = 1, 2, \ldots, n)$$

step S4: the vector quantity $\overline{W} = \lfloor \overline{W_1}, \overline{W_2}, \ldots, \overline{W_j} \rfloor$ (j=1, 2, ..., n), performing a normalization on the vector quantity $\overline{W}$ so that an obtained result is an eigenvector, that is:

$$W = \frac{\overline{W}}{\sum_{j=1}^{n} \overline{W_j}}, (j = 1, 2, \ldots, n)$$

wherein an element in the eigenvector W is a weight of a corresponding parameter;

step S5: calculating the maximum feature root by the judgment matrix and the eigenvector, namely:

$$\lambda_{max} = \sum_{i=1}^{n} \frac{(BW)_i}{nW_j}$$

wherein: $(BW)_i$ represents the ith element of the vector;

step S6: calculating a consistency of the judgment matrix, and then verifying by the following formulas:

$$CR = \frac{CI}{RI}$$

$$CI = \frac{\lambda_{max} - n}{n - 1}$$

wherein: CI represents a consistency parameter and RI represents a random consistency parameter, with values being shown in the following table:

| n | 1 | 2 | 3 | 4 | 5 | 6 | 7 | 8 | 9 |
|---|---|---|---|---|---|---|---|---|---|
| RI | 0 | 0 | 0.58 | 0.94 | 1.12 | 1.24 | 1.32 | 1.41 | 1.45 | if CR<0.1, a degree of inconsistency of the judgment matrix is determined within a permissible range, and the eigenvector of the judgment matrix is a weight vector; otherwise, returning back the step S1 to adjust a relative importance of two elements until satisfy the consistency condition.

6. The quantitative scoring and optimization method of a drilling and completion loss-control material as claimed in claim 1, wherein the step of performing evaluation on the key performance parameters of the conventional loss-control materials in the step 4 comprises: according to an established parameter evaluation standard, dividing the key performance parameters of the conventional loss-control materials into five grades: a high grade, a medium-high grade, a medium grade, a medium-low grade and a low grade respectively corresponding to a different score, and wherein the parameter evaluation standard is obtained through performing performance evaluation on a large number of loss-control materials, and some of the performance parameter evaluation is shown in the following table:

| Performance parameter | Parameter evaluation | | | | |
|---|---|---|---|---|---|
| Degree of sphericity | ≤0.3 low | 0.3-0.5 medium-low | 0.5-0.7 medium | 0.7-0.9 medium-high | >0.9 high |
| Friction coefficient | ≤0.5 low | 0.5-0.8 medium-low | 0.8-1.1 medium | 1.1-1.4 medium-high | >1.4 high |
| Temperature resistance | >0.3 low | 0.2-0.3 medium-low | 0.1-0.2 medium | 0.05-0.1 medium-high | ≤0.05 high |
| Abrasion resistance | >0.3 low | 0.2-0.3 medium-low | 0.1-0.2 medium | 0.05-0.1 medium-high | ≤0.05 high |
| Aspect ratio of fiber | ≤100 low | 100-200 medium-low | 200-400 medium | 400-600 medium-high | >600 high |
| Soluble rate | ≤0.2 low | 0.2-0.4 medium-low | 0.4-0.6 medium | 0.6-0.8 medium-high | >0.8 high |
| Temperature resistance of particle size | >0.3 low | 0.2-0.3 medium-low | 0.1-0.2 medium | 0.05-0.1 medium-high | ≤0.05 high |
| Strength temperature resistance | >0.3 low | 0.2-0.3 medium-low | 0.1-0.2 medium | 0.05-0.1 medium-high | ≤0.05 high. |

7. The quantitative scoring and optimization method of a drilling and completion loss-control material as claimed in claim 1, wherein a formula for calculating comprehensive scores of each conventional loss-control material in the step 5 is:

$$S = \sum_{i=1}^{n} \varphi_i(x) \phi_i(x)$$

Wherein: S represents a final score of the loss-control materials or plugging formula, $\varphi_i^{(x)}$ and $\phi_i^{(x)}$ respectively represents the weight of each key performance parameter and a score value of a corresponding parameter.

8. The quantitative scoring and optimization method of a drilling and completion loss-control material as claimed in claim 1, wherein the best type of the loss-control materials in the step 6 is a kind of loss-control material with the highest score, or a score is ranked in the top 5% of scores of the loss-control materials from the top to the bottom under considering an economic cost of the loss-control materials.

\* \* \* \* \*